No. 792,848. PATENTED JUNE 20, 1905.
G. W. RICHARDSON & H. J. SAMS.
TIME WATER HEATER AND ALARM.
APPLICATION FILED NOV. 6, 1903.
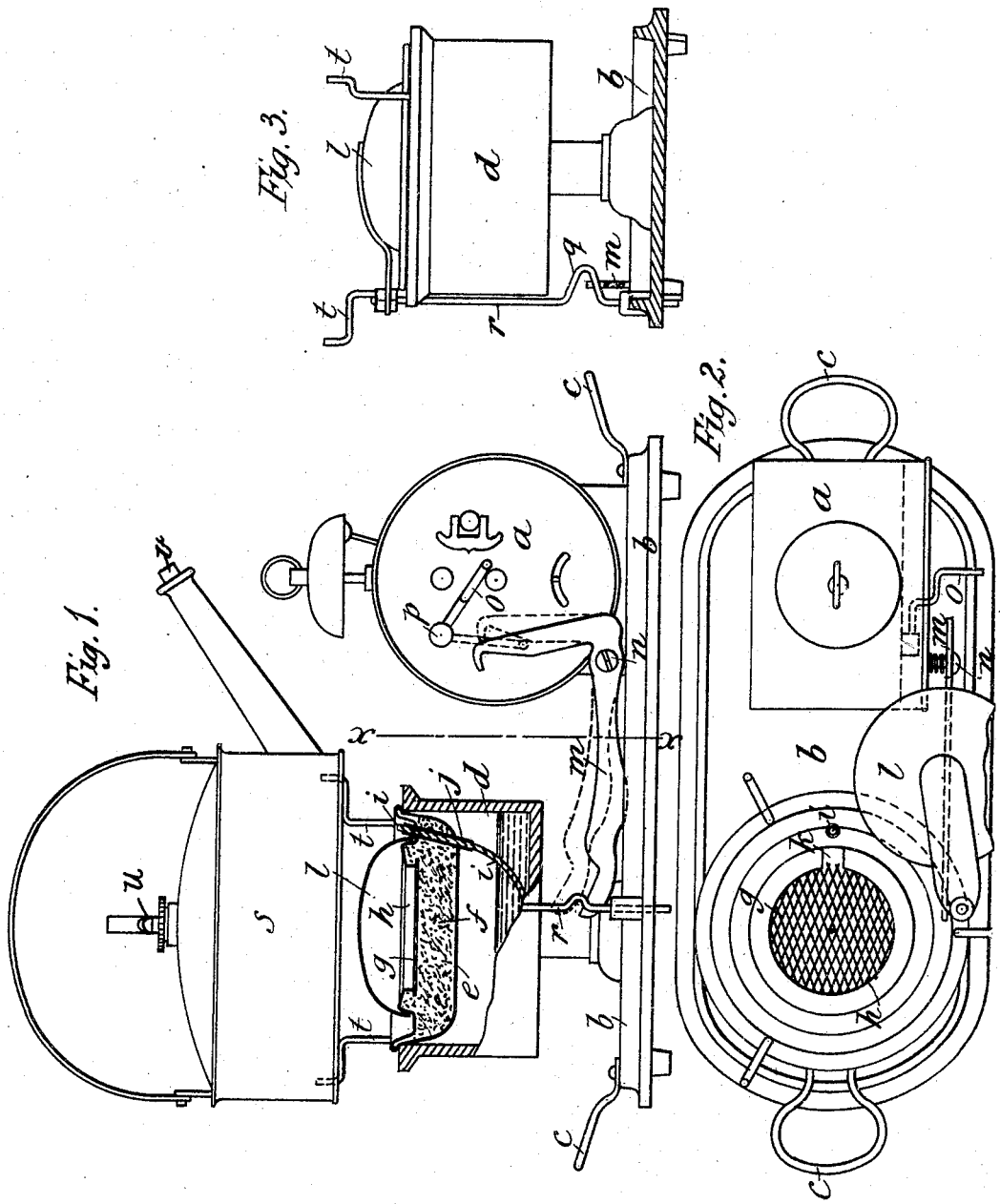
Witnesses
J. J. Rowley
J. M. Mellor.
Inventors
George William Richardson
Henry James Sams
per J. B. Heuret
attorney No. 792,848.    Patented June 20, 1905.

UNITED STATES PATENT OFFICE.

GEORGE WILLIAM RICHARDSON AND HENRY JAMES SAMS, OF PETER-
BOROUGH, ENGLAND.

TIME WATER-HEATER AND ALARM.

SPECIFICATION forming part of Letters Patent No. 792,848, dated June 20, 1905.

Application filed November 6, 1903. Serial No. 180,103.

*To all whom it may concern:*

Be it known that we, GEORGE WILLIAM RICHARDSON, engineer's fitter, residing at 74 Palmerston road, Woodstone, and HENRY JAMES SAMS, commercial traveler, residing at 8 Saxon Villas, London Road, Peterborough, in the county of Northampton, England, both subjects of the King of Great Britain and Ireland, have invented certain new and useful Improvements in Automatic Water-Heaters and Alarms, of which the following is a specification.

This invention has for its object improved means for automatically boiling water and sounding an alarm at any desired time. For this purpose we provide an ordinary alarm-clock and a stove to burn methylated spirits, the said clock and stove being placed upon or fitted to a stand or table which may be provided with handles at each end for convenience in carrying.

The stove consists, preferably, of a circular metal reservoir for containing oil, and the part forming the burner is constructed of a removable chamber fitted into the top of said reservoir and packed with asbestos, the said chamber having an opening in the top and the asbestos being covered by wire-gauze across said opening and saturated with the spirit.

An asbestos or other wick or cord passes from the reservoir through a tube in the burner-chamber for providing a night or pilot light. The reservoir is fitted with a pivoted cover, which lies over the top of the burner when the latter is not in use and which is automatically turned aside, so as to uncover the burner at the desired time set by the clock-alarm.

The reservoir is provided with supports for holding a kettle or other vessel above the burner for boiling water, the kettle being filled through a screw-plug in the top of the same. The spout of the kettle is provided with a screw-stopper, thus keeping it steam-tight, and its top, formed in one with the body, so as to dispense with a cover, is fitted with a steam-whistle for giving an alarm when the water boils.

The alarm-spindle is provided with a cranked arm projecting from the back of the clock, which arm as the alarm sounds at its appointed time revolves until it comes in contact with a lever which bears against a projection on a vertical rod forming the pivot of the burner-cover and raises and turns the latter from its closed position, thus causing the burner to be lighted from the pilot-light at its side, and in order to more clearly understand our said invention reference is had to the accompanying sheet of drawings, in which—

Figure 1 is an elevation of the apparatus at the back of the same, the reservoir and burner being shown partly in section. Fig. 2 is a plan of the same with the burner-cover open, and Fig. 3 is a cross-section on the line $x$ $x$ of Fig. 1.

$a$ is the alarm-clock, fixed to the stand or table $b$, provided with handles $c$ at each end.

$d$ is the oil-reservoir, and $e$ the burner-chamber, fitted to the top of the same, so as to be removed therefrom for filling the latter with the requisite quantity of oil. The chamber $e$ is packed with asbestos $f$, which is covered with wire-gauze $g$ across the opening $h$, forming the burner.

$i$ is the wick or cord passing from the reservoir up through the tube $j$ to form a pilot or night light at the side of the burner.

$k$ is an opening in the chamber exposing the asbestos to the pilot-light for lighting the burner when the cover $l$ is removed. $m$ is the lever, pivoted at $n$ for automatically opening the said cover by means of the cranked arm $o$, fixed to the alarm-spindle $p$, bearing against the upright arm of the lever and raising the end of the other or longer arm. This end is formed so as to support the curved or cranked part $q$ of a vertical rod $r$, pivoted to the reservoir and to which the cover is fixed.

The kettle $s$ is supported on the arms $t$ above the burner and is fitted at the top with a steam-whistle $u$, the spout being also fitted with a screw-stopper $v$ for keeping it steam-tight. The kettle may be filled with water by unscrewing the whistle or by a separate screw-plug.

In operation the alarm is set in the usual manner to the desired time and the arm $o$ turned back to the position shown. As soon as the alarm sounds the arm $o$ turns until it comes into contact with the vertical arm of the lever *m* and pushes the latter back a short distance, as shown in dotted lines, thus raising the other arm of the lever, and with it the rod *r*, the cranked part *q* of which sliding down the inclined end of said lever causes the rod *r* to turn, and thus to bring the cover *l* into its open position, as shown in Fig. 2. The pilot-light is thus exposed to the asbestos *f* through the opening *k*, and the asbestos having previously been saturated with methylated spirit is set alight beneath the kettle, so as to boil the water therein, the whistle *u* sounding directly the water boils.

Having now fully described the nature of our said invention, what we claim, and desire to secure by Letters Patent, is—

In an automatic water-heater and alarm the combination of an oil-reservoir, a spirit-burner fitted thereto, a pilot-light fed by a wick from the reservoir, a pivoted cover carried by a vertical rod above the burner, a pivoted lever formed with an inclined part supporting said rod, and an alarm-clock fitted with a cranked arm fixed to the alarm-spindle for operating the said lever for the purpose of uncovering the burner, substantially as described.

In witness whereof we have hereunto set our hands in the presence of two witnesses.

GEORGE WILLIAM RICHARDSON.
HENRY JAMES SAMS.

Witnesses:
FREDERICK MICAH MELLOR,
H. D. JAMESON.